United States Patent
Oddone et al.

(10) Patent No.: US 6,831,499 B2
(45) Date of Patent: Dec. 14, 2004

(54) NEGATIVE CHARGE PUMP WITH BULK BIASING

(75) Inventors: Giorgio Oddone, Rossiglione (IT); Massimiliano Frulio, Milan (IT); Luca Figini, Lomazzo (IT); Fabio Tassan Caser, Milan (IT)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 10/407,615

(22) Filed: Apr. 3, 2003

(65) Prior Publication Data

US 2004/0057259 A1 Mar. 25, 2004

(30) Foreign Application Priority Data

Sep. 20, 2002 (IT) ...................................... TO2002A0821

(51) Int. Cl.[7] ................................................. G05F 1/10
(52) U.S. Cl. ...................................................... 327/536
(58) Field of Search .............. 363/59, 60; 327/534–537

(56) References Cited

U.S. PATENT DOCUMENTS

| | | | | |
|---|---|---|---|---|
| 5,754,476 A | * | 5/1998 | Caser et al. ........... | 365/185.29 |
| 6,130,572 A | | 10/2000 | Ghilardelli et al. ......... | 327/536 |
| 6,373,324 B2 | * | 4/2002 | Li et al. ..................... | 327/536 |
| 6,452,438 B1 | * | 9/2002 | Li ................................ | 327/536 |
| 6,605,985 B2 | * | 8/2003 | Pagliato et al. ............. | 327/536 |

* cited by examiner

*Primary Examiner*—Matthew V. Nguyen
(74) *Attorney, Agent, or Firm*—Sierra Patent Group, Ltd.

(57) ABSTRACT

An n-channel MOS transistor negative-voltage charge pump is disclosed in which the bulks of the n-channel MOS transistors are biased in such a manner as to prevent turning on the parasitic bipolar transistor inherent in the CMOS environment of the charge pump structure.

4 Claims, 4 Drawing Sheets

US 6,831,499 B2

NEGATIVE CHARGE PUMP WITH BULK BIASING

PRIORITY CLAIM

This application claims priority to Italian Application Serial Number 2002A000821, filed Sep. 20, 2002.

BACKGROUND OF THE INVENTION

1. Field of the Invention

The present invention relates to charge pump circuits. More particularly, the present invention relates to a negative charge pump that switch the bulk of each transistor stage to the lowest potential node to minimize body effect.

2. The State of the Art

In integrated circuit applications such as flash memory, EEPROMs and the like, generation of a negative voltage is required. In the case of non-volatile memories that operate with only one level of supply voltage, the internal high voltages are generated with charge pumps. The charge pumps are used to generate both positive and negative voltages. Charge pumps for generating negative voltages are usually formed using triple-well processes. Such negative charge pumps use n-channel MOS transistors pump a voltage line to a negative value.

Referring to FIG. 1, a schematic diagram depicts a commonly employed prior-art implementation of a negative charge pump formed from n-channel MOS transistors. Charge pump 10 includes three stages, 12, 14, and 16, driven by a four-phase clock. Each stage includes two n-channel MOS transistors and two capacitors.

Stage 12 includes n-channel MOS transistors 18 and 20. N-channel MOS transistor 18 has its drain coupled to ground, its source coupled to the source of n-channel MOS transistor 20 and its gate coupled to the drain of n-channel MOS transistor 20 and to the phase-D signal of the clock through capacitor 22. The gate of n-channel transistor 20 is coupled to the drain of n-channel MOS transistor 18 and to the phase-A signal of the clock through capacitor 24.

Stage 14 includes n-channel MOS transistors 26 and 28. N-channel MOS transistor 26 has its drain coupled to the sources of n-channel MOS transistors 18 and 20 from stage 12, its source coupled to the source of n-channel MOS transistor 28 and its gate coupled to the drain of n-channel MOS transistor 28 and to the phase-B signal of the clock through capacitor 30. The gate of n-channel transistor 28 is coupled to the drain of n-channel MOS transistor 26 and to the phase-C signal of the clock through capacitor 32.

Stage 16 includes n-channel MOS transistors 34 and 36. N-channel MOS transistor 34 has its drain coupled to the sources of n-channel MOS transistors 26 and 28 from stage 14, its source coupled to the source of n-channel MOS transistor 36 and its gate coupled to the drain of n-channel MOS transistor 36 and to the phase-D signal of the clock through capacitor 38. The gate of n-channel transistor 36 is coupled to the drain of n-channel MOS transistor 34 and to the phase-A signal of the clock through capacitor 40.

As may be seen from an examination of FIG. 1, each of the n-channel MOS transistors 18, 20, 26, 28, 34, and 36 has its bulk connected to the most negative node (VNEG at reference numeral 42) that serves as the output of the charge pump. The reason for this is to avoid turning on the parasitic bipolar transistor formed in each stage by the buried n-well, the p-well and the n+ source and drain regions of the n-channel MOS transistors.

In the charge-pump circuit of FIG. 1, the parasitic bipolar transistor in the last stage 16 can be turned on during the transition toward the steady state (from 0 to VNEG) when the phase-A signal of the clock goes low to sink current from the load. If the bipolar transistor turns on, the efficiency of the charge pump is compromised because the current is no longer sunk by the load but from the grounded buried-n-well collector of the bipolar transistor.

Moreover another drawback of the implementation of FIG. 1 is that body effect of the n-channel MOS transistors of the charge pump increases moving from right to left of the pump. This can severely limit the performance of the charge pump in terms of maximum negative voltage in those applications where very low power supply voltages are employed.

Referring now to FIG. 2, a schematic diagram shows a prior-art solution that can be adopted to reduce but does not eliminate the body effect inside each stage of the charge pump. The circuit of FIG. 2 is substantially similar to the circuit of FIG. 1, except that the bulks of the two n-channel MOS transistors in each stage are coupled to the output node of the stage. Thus, the bulks of n-channel MOS transistors 18 and 20 are coupled to their common sources; the bulks of n-channel MOS transistors 26 and 28 are coupled to their common sources; and the bulks of n-channel MOS transistors 34 and 36 are coupled to their common sources. This configuration does not solve the parasitic bipolar turn-on problem in the last stage 16.

Another technique to reduce the body effect is disclosed in U.S. Pat. No. 6,130,572. This circuit has the same drawback of FIG. 2. In particular, for low-voltage applications, the problem of threshold-voltage increase due to body effect is very important because the difference between the $V_{DD}$ and $V_{th}$ of the MOS transistors is reduced and degrades performance.

Another prior-art technique used to reduce the influence of the body effect is to use a level shifter to boost the phase of the charge pumps but in this way the efficiency ($I_{load}/I_{VDD}$) of the charge pump is reduced. Another drawback of this method is that the silicon area is undesirably increased.

BRIEF DESCRIPTION OF THE INVENTION

The present invention provides a n-channel MOS transistor charge pump in which the bulks of the n-channel MOS transistors are biased in such a manner as to prevent turning on the parasitic bipolar transistor inherent in the CMOS environment of the charge pump structure.

A negative-voltage charge pump has a plurality of operating phases and comprises a plurality of stages, each stage comprising at least two n-channel MOS transistors each including bulk regions. Each of said stages also includes a parasitic bipolar transistor. The bulk regions are switchably coupled during each of the operating phases to a circuit node having a potential such that the parasitic bipolar transistor will not turn on.

BRIEF DESCRIPTION OF THE DRAWING FIGURES

DETAILED DESCRIPTION OF THE INVENTION

Persons of ordinary skill in the art will realize that the following description of the present invention is only illustrative and not in any way limiting. Other embodiments of this invention will be readily apparent to those skilled in the art having benefit of this disclosure.

The purpose of the present invention is to overcome some of the aforementioned drawbacks by biasing the bulk of each stage of the charge pump in such a way that body effect is eliminated (Vbs=0 when transistors are on) and the parasitic bipolar transistors never turn on even in the output stage.

Figure 2:
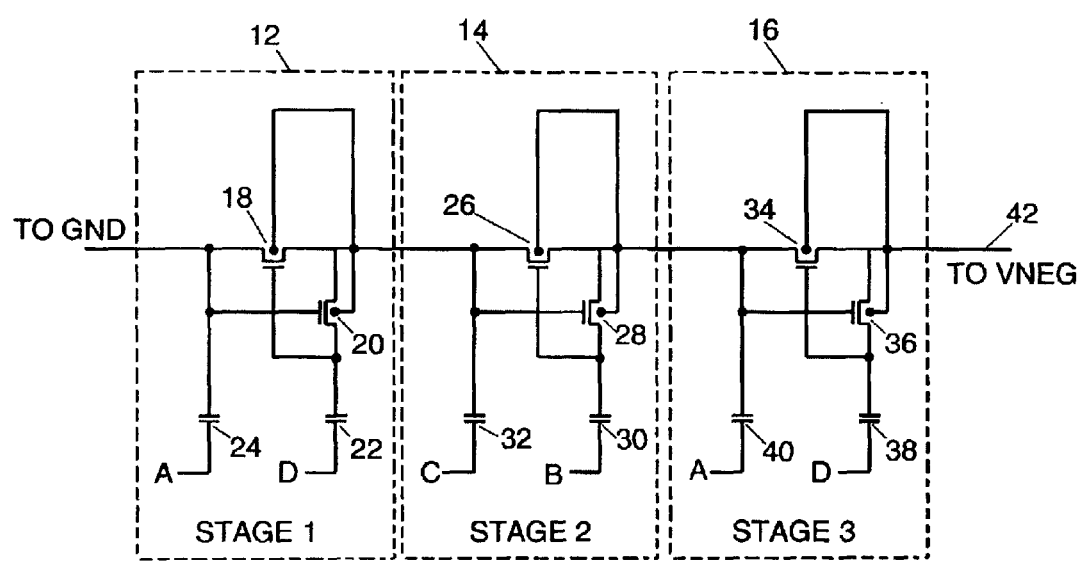
FIG. 2 is a schematic diagram depicting another prior-art implementation of a negative charge pump employing n-channel MOS transistors.
Figure 3:
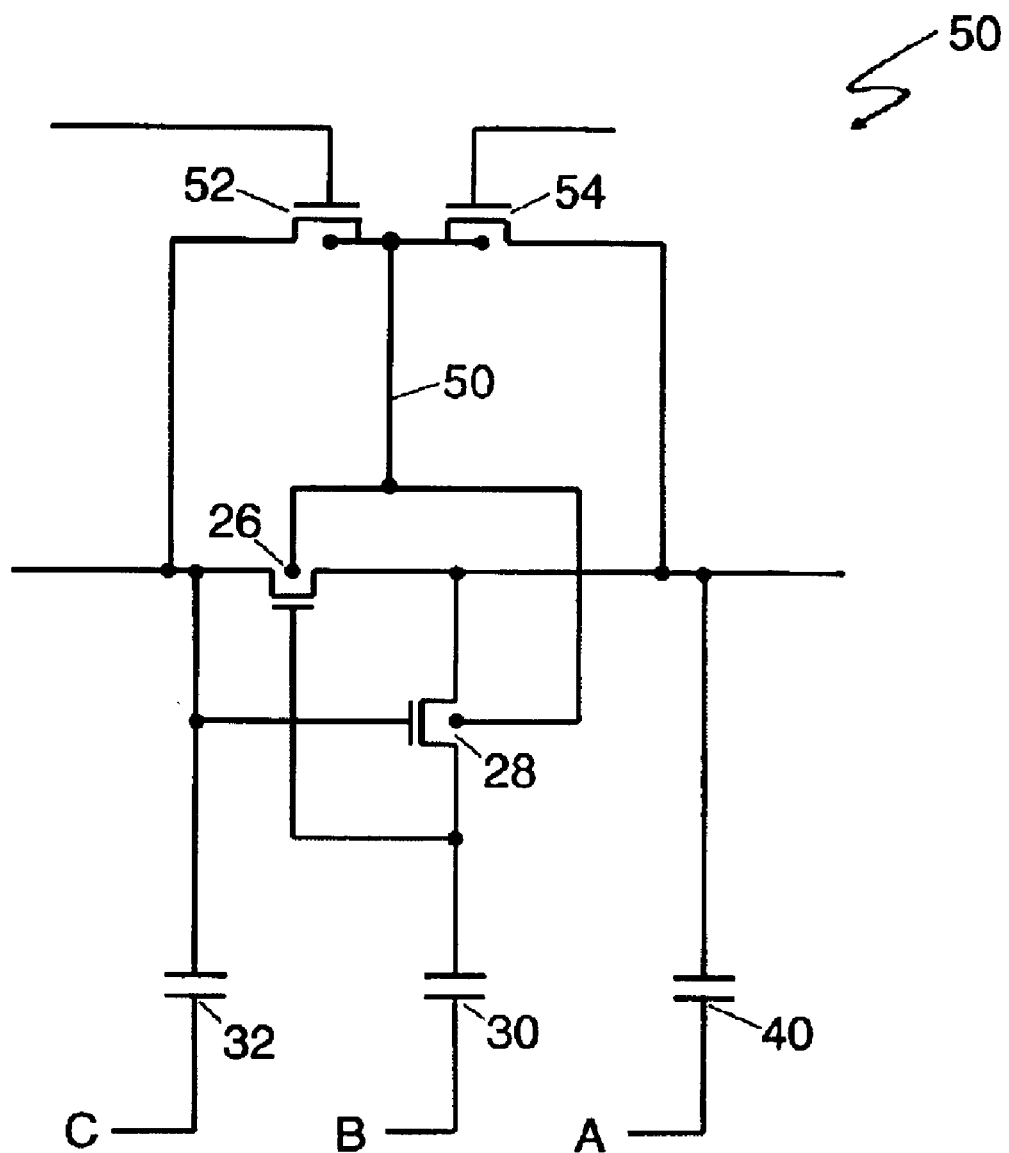
FIG. 3 is a schematic diagram depicting a single stage of a negative charge pump employing n-channel MOS transistors according to the present invention.

Referring now to FIG. 3, a schematic diagram shows an illustrative embodiment of a single stage 50 of an illustrative charge pump that operates in accordance with the principles of the present invention. For an ease of understanding the present invention, FIG. 3 illustrates a stage corresponding to the second stage of the charge pumps of FIGS. 1 and 2 and the same reference numerals as used in those figures will be used in FIG. 3 to identify corresponding circuit elements.

Stage 50 includes n-channel MOS transistors 26 and 28. As in the prior-art charge pump circuits of FIGS. 1 and 2, n-channel MOS transistor 26 has its drain coupled to the common sources of the two n-channel MOS transistors from the preceding stage (which in this case would be the sources of n-channel MOS transistors corresponding to reference numerals 18 and 20 of FIGS. 1 and 2) (or to ground if stage 50 is the first stage), its source coupled to the source of n-channel MOS transistor 28 and its gate coupled to the drain of n-channel MOS transistor 28 and to the phase-B signal of the clock through capacitor 30. The gate of n-channel transistor 28 is coupled to the drain of n-channel MOS transistor 26 and to the phase-C signal of the clock through capacitor 32. The phase-A signal of the clock is shown coupled to the common sources of n-channel MOS transistors 26 and 28 through capacitor 40 as it is in the charge pumps depicted in FIGS. 1 and 2.

The bulks of n-channel MOS transistors 26 and 28 are connected together to a node 50. Node 50 is coupled to the drains of both n-channel MOS transistors 52 and 54 as well as to their bulk regions. The source of n-channel MOS transistor 52 is coupled to the common sources of the two n-channel MOS transistors of the previous stage, and the source of n-channel MOS transistor 54 is coupled to the common sources of the two n-channel MOS transistors 26 and 28. The gate of n-channel MOS transistor 52 is coupled to the drain and gate of n-channel MOS transistor 28 and the gate of n-channel MOS transistor 54 is coupled to the common sources of n-channel MOS transistors 26 and 28.

This single stage 50 works as before: when the phase-A signal of the clock is high and the phase-C signal of the clock is low, the phase-B signal of the clock also goes high and turns on n-channel MOS transistor 26, allowing current to flow from capacitor 40 to capacitor 30 thus discharging capacitor 40 and charging up capacitor 30. Then the phase-A signal of the clock goes low and receives charge from the following stage while the phase-C signal of the clock goes high, transferring charge to the previous stage.

Adding the two transistors 52 and 54 to each stage prevents the parasitic bipolar transistor from being turned on. When the phase-C signal of the clock is high and the phase-A signal of the clock is low, the phase-B signal of the clock is also low, n-channel MOS transistor 52 is turned off and n-channel MOS transistor 54 is turned on, thus biasing node 50 to the same potential of as the common sources of n-channel MOS transistors 26 and 28, which is the lowest voltage seen by the transistors of this stage. In the other half period when the phase-A signal of the clock is high and the phase-C signal of the clock is low, the phase-B signal of the clock is also high and n-channel MOS transistor 54 is turned off but n-channel MOS transistor 52 is turned on, thus assuring that the bulk regions of n-channel MOS transistors 26 and 28 are at a potential that is more negative or the same as any n+ region of the stage.

Figure 4:
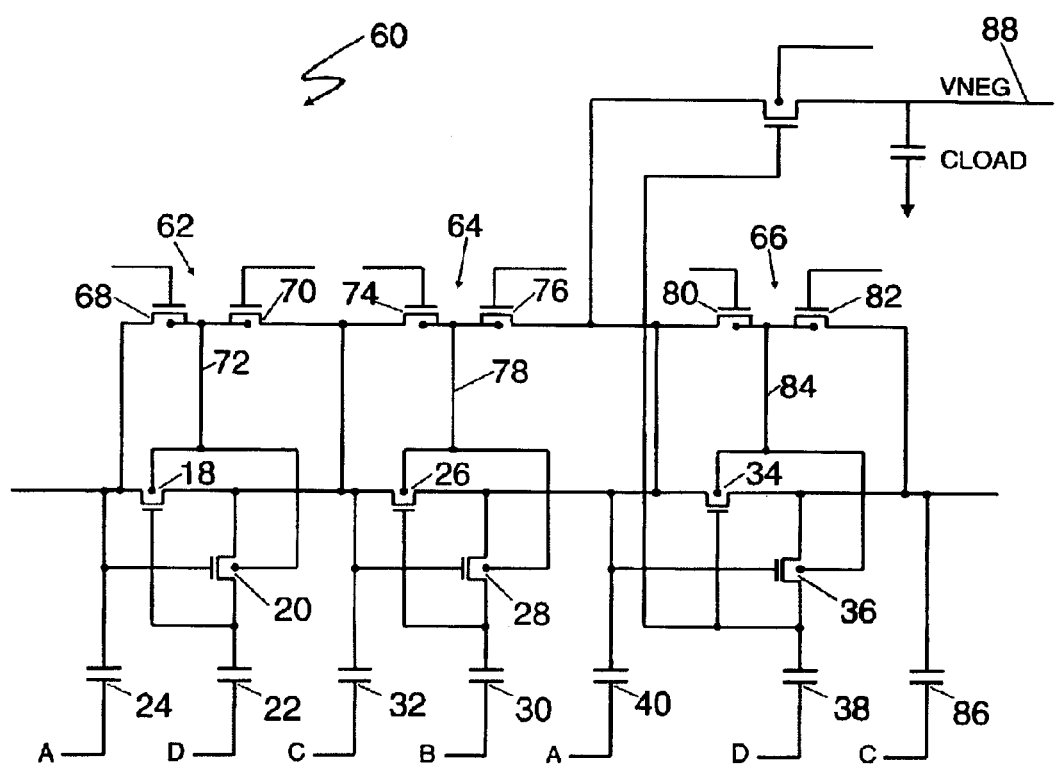
FIG. 4 is a schematic diagram depicting multiple stages of a negative charge pump employing n-channel MOS transistors according to the present invention.

Referring now to FIG. 4, a schematic diagram shows an illustrative charge-pump circuit 60 in accordance with the present invention including multiple charge-pump stages. As with the circuit of FIG. 3, the same reference numerals as used in FIGS. 1 and 2 will be used in FIG. 4 to identify corresponding circuit elements.

Figure 1:
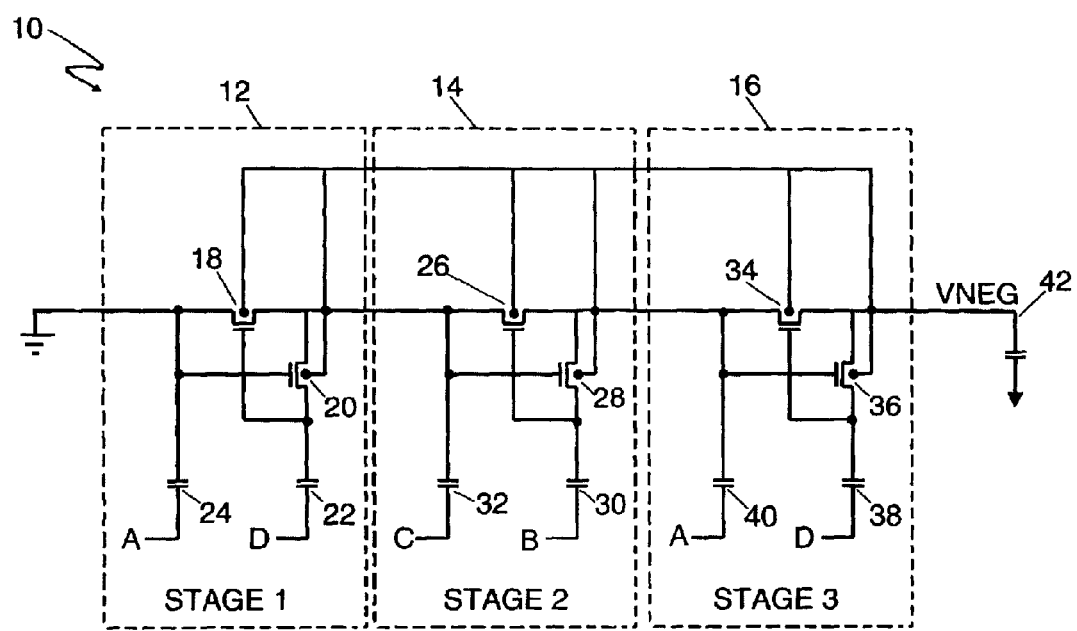
FIG. 1 is a schematic diagram depicting a common implementation of a negative charge pump employing n-channel MOS transistors.

As shown in the charge-pump circuit 10 of FIG. 1, charge-pump circuit 60 of FIG. 4 includes three stages, 62, 64, and 66, driven by a four-phase clock. Each stage includes the same two n-channel MOS transistors and two capacitors.

Stage 62 includes n-channel MOS transistors 18 and 20. N-channel MOS transistor 18 has its drain coupled to ground, its source coupled to the source of n-channel MOS transistor 20 and its gate coupled to the drain of n-channel MOS transistor 20 and to the phase-D signal of the clock through capacitor 22. The gate of n-channel transistor 20 is coupled to the drain of n-channel MOS transistor 18 and to the phase-A signal of the clock through capacitor 24.

In addition, stage 62 includes n-channel MOS transistors 68 and 70 having their drains coupled together to node 72 comprising the bulk regions of n-channel MOS transistors 18 and 20 as well as the bulk regions of n-channel MOS transistors 68 and 70. The source of n-channel MOS transistor 68 is coupled to the drain of n-channel MOS transistor 18 and its gate is coupled to the drain of n-channel MOS transistor 20. The source of n-channel MOS transistor 70 is coupled to the common sources of n-channel MOS transistors 18 and 20 and its gate is coupled to the drain of n-channel MOS transistor 18.

Stage 64 includes n-channel MOS transistors 26 and 28. N-channel MOS transistor 18 has its drain coupled to the sources of n-channel MOS transistors 18 and 20 from stage 62, its source coupled to the source of n-channel MOS transistor 28 and its gate coupled to the drain of n-channel MOS transistor 28 and to the phase-B signal of the clock through capacitor 30. The gate of n-channel transistor 28 is coupled to the drain of n-channel MOS transistor 26 and to the phase-C signal of the clock through capacitor 32.

In addition, stage 64 includes n-channel MOS transistors 74 and 76 having their drains coupled together to node 78 comprising the bulk regions of n-channel MOS transistors 26 and 28 as well as the bulk regions of n-channel MOS transistors 74 and 76. The source of n-channel MOS transistor 74 is coupled to the drain of n-channel MOS transistor 26 and its gate is coupled to the drain of n-channel MOS transistor 28. The source of n-channel MOS transistor 76 is coupled to the common sources of n-channel MOS transistors 26 and 28 and its gate is coupled to the drain of n-channel MOS transistor 26.

Stage 66 includes n-channel MOS transistors 34 and 36. N-channel MOS transistor 34 has its drain coupled to the sources of n-channel MOS transistors 26 and 28 from stage 64, its source coupled to the source of n-channel MOS transistor 36 and its gate coupled to the drain of n-channel MOS transistor 36 and to the phase-D signal of the clock through capacitor 38. The gate of n-channel transistor 36 is coupled to the drain of n-channel MOS transistor 34 and to the phase-A signal of the clock through capacitor 40.

In addition, stage 66 includes n-channel MOS transistors 80 and 82 having their drains coupled together to node 84 comprising the bulk regions of n-channel MOS transistors 34 and 36 as well as the bulk regions of n-channel MOS transistors 80 and 82. The source of n-channel MOS transistor 80 is coupled to the drain of n-channel MOS transistor 34 and its gate is coupled to the drain of n-channel MOS transistor 36. The source of n-channel MOS transistor 82 is coupled to the common sources of n-channel MOS transistors 34 and 36 and its gate is coupled to the drain of n-channel MOS transistor 34. Stage 66 also includes capacitor 86 coupling the phase-C signal of the clock to the sources of n-channel MOS transistors 34 and 36.

The output of the charge pump of FIG. 4 is the VNEG node 88 at the source of n-channel MOS transistor 90. The drain of n-channel MOS transistor 90 is coupled to the sources of n-channel MOS transistors 26 and 28. The gate of n-channel MOS transistor is coupled to the drain of n-channel MOS transistor 36. The bulk of n-channel MOS transistor 90 is coupled to node 78.

In the embodiment of FIG. 4, the last stage 66 is not used to transfer charge, but is present for the purpose of properly biasing the gate of n-channel MOS transistor 90.

The capacitors 22, 24, 30, 32, 38, 40, and 86 used in the circuits of FIGS. 3 and 4 may be formed as either poly-1 to poly-2 capacitors or as MOS capacitors. Typical values for these capacitors may be from about 500 fF to about 7 pF, although capacitors 38 and 86 in the last stage may have low values since they are not used to transfer charge to the load.

Persons of ordinary skill in the art will appreciate that, from the disclosure of FIG. 4, charge-pump circuits according to the principles of the present invention may be realized using any number of stages.

Using the circuit shown in FIG. 4, the problem of turning on the parasitic bipolar transistor in the output stage can be overcome. All transistors 34, 36, 80, and 82 have their bulk regions biased more negatively or at the same potential of any n+ junction of the stage.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A negative-voltage charge pump having a plurality of operating phases and comprising a plurality of stages, each stage comprising at least two n-channel MOS transistors each including bulk regions, each of said stages also including a parasitic bipolar transistor, said bulk regions switchably coupled during each of said operating phases to a circuit node having a potential such that said parasitic bipolar transistor will not turn on.

2. The negative-voltage charge pump of claim 1, wherein said bulk regions of each of said stages are switchably coupled during each of said operating phases to a circuit node having a potential such that said parasitic bipolar transistor remains turned off by one of a first n-channel MOS bulk-switch transistor and a second n-channel MOS bulk-switch transistor.

3. A negative charge-pump stage comprising:
an input node;
an output node;
a phase-A clock signal node;
a phase-D clock signal node;
a first n-channel MOS transistor having a drain coupled to said input node, a source coupled to said output node, a gate, and a bulk region coupled to a bulk-region node;
a second n-channel MOS transistor having a drain, a source coupled to said output node, a gate coupled to said input node, and a bulk region coupled to a bulk-region node;
a first capacitor coupled between said input node and said phase-A clock signal node;
a second capacitor coupled between said drain of said second n-channel MOS transistor and said phase-D clock signal node;
a first n-channel MOS bulk-switch transistor having a drain coupled to said bulk-region node, a source coupled to said input node, a gate coupled to said drain of said second n-channel MOS transistor, and a bulk region coupled to said bulk-region node; and
a second n-channel MOS bulk-switch transistor having a drain coupled to said bulk-region node, a source coupled to said output node, a gate coupled to said input node, and a bulk region coupled to said bulk-region node.

4. A negative-voltage charge pump comprising:
a phase-A clock signal node;
a phase-B clock signal node;
a phase-C clock signal node;
a phase-D clock signal node;
a first charge-pump stage including:
a first-stage input node coupled to a fixed potential;
a first-stage output node;
a first n-channel MOS transistor having a drain coupled to said first-stage input node, a source coupled to said first-stage output node, a gate, and a bulk region coupled to a first-stage bulk-region node;
a second n-channel MOS transistor having a drain, a source coupled to said first-stage output node, a gate coupled to said first-stage input node, and a bulk region coupled to said first-stage bulk-region node;
a first capacitor coupled between said first-stage input node and said phase-A clock signal node;
a second capacitor coupled between said drain of said second n-channel MOS transistor and said phase-D clock signal node;
a first n-channel MOS bulk-switch transistor having a drain coupled to said bulk-region node, a source coupled to said first-stage input node, a gate coupled to said drain of said second n-channel MOS transistor, and a bulk region coupled to said first-stage bulk-region node;
a second n-channel MOS bulk-switch transistor having a drain coupled to said first-stage bulk-region node, a source coupled to said first-stage output node, a gate coupled to said first-stage input node, and a bulk region coupled to said first-stage bulk-region node;
a second charge-pump stage including:
a second-stage input node coupled to said first-stage output node;
a second-stage output node;
a third n-channel MOS transistor having a drain coupled to said second-stage input node, a source coupled to said second-stage output node, a gate, and a bulk region coupled to a second-stage bulk-region node;

a fourth n-channel MOS transistor having a drain, a source coupled to said second-stage output node, a gate coupled to said second-stage input node, and a bulk region coupled to said second-stage bulk-region node;

a third capacitor coupled between said second-stage input node and said phase-C clock signal node;

a fourth capacitor coupled between said drain of said fourth n-channel MOS transistor and said phase-B clock signal node;

a third n-channel MOS bulk-switch transistor having a drain coupled to said second-stage bulk-region node, a source coupled to said second-stage input node, a gate coupled to said drain of said fourth n-channel MOS transistor, and a bulk region coupled to said second-stage bulk-region node;

a fourth n-channel MOS bulk-switch transistor having a drain coupled to said second-stage bulk-region node, a source coupled to said second-stage output node, a gate coupled to said second-stage input node, and a bulk region coupled to said second-stage bulk-region node;

a third charge-pump stage including:

a third-stage input node coupled to said second-stage output node;

a third-stage output node;

a fifth n-channel MOS transistor having a drain coupled to said third-stage input node, a source coupled to said third-stage output node, a gate, and a bulk region coupled to a third-stage bulk-region node;

a sixth n-channel MOS transistor having a drain, a source coupled to said third-stage output node, a gate coupled to said third-stage input node, and a bulk region coupled to said third-stage bulk-region node;

a fifth capacitor coupled between said third-stage input node and said phase-A clock signal node;

a sixth capacitor coupled between said drain of said sixth n-channel MOS transistor and said phase-D clock signal node;

a seventh capacitor coupled between said third-stage output node and said phase-C clock signal node;

a fifth n-channel MOS bulk-switch transistor having a drain coupled to said third-stage bulk-region node, a source coupled to said third-stage input node, a gate coupled to said drain of said sixth n-channel MOS transistor, and a bulk region coupled to said third-stage bulk-region node;

a sixth n-channel MOS bulk-switch transistor having a drain coupled to said third-stage bulk-region node, a source coupled to said third-stage output node, a gate coupled to said third-stage input node, and a bulk region coupled to said third-stage bulk-region node; and an output stage including a seventh n-channel MOS transistor having source coupled to said charge-pump output node, a drain coupled to said second-stage output node, a gate coupled to said drain of said sixth n-channel MOS transistor, and a bulk region coupled to said second-stage bulk-region node.

* * * * *